US000001938H

(19) United States

(12) Statutory Invention Registration (10) Reg. No.: US H1938 H

Harkins et al. (43) Published: *Feb. 6, 2001

(54) SUPERCAVITATING WATER-ENTRY PROJECTILE

(75) Inventors: Thomas K. Harkins, Fredericksburg, VA (US); Howard K. Steves, Silver Spring; Jacques E. Goeller, Ellicott City, both of MD (US)

(73) Assignee: The United States of America as represented by the Secretary of the Navy, Washington, DC (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/229,163

(22) Filed: Jan. 13, 1999

Related U.S. Application Data

(62) Division of application No. 09/014,688, filed on Jan. 28, 1998, now Pat. No. 5,955,698.

(51) Int. Cl.[7] ..... F42B 15/20

(52) U.S. Cl. ..... 102/399; 114/20.1

(58) Field of Search ..... 102/399, 398, 102/517, 500, 521, 522, 501; 244/3.1, 3.24, 3.3; 114/20.1, 21.1, 21.2

(56) References Cited

U.S. PATENT DOCUMENTS

| | | | | |
|---|---|---|---|---|
| 298,455 | * | 5/1884 | Ericsson | 102/399 |
| 1,371,207 | * | 3/1921 | Wilkinson | 102/399 |
| 3,002,453 | * | 10/1961 | Fedor et al. | 102/398 |
| 3,088,403 | * | 5/1963 | Bartling et al. | 102/399 |
| 3,282,216 | * | 11/1966 | Calfee et al. | 244/3.3 |
| 3,434,425 | * | 3/1969 | Critcher | 102/399 |
| 3,476,048 | * | 11/1969 | Barr et al. | 102/399 |
| 3,477,376 | * | 11/1969 | Nelson et al. | 102/399 |
| 3,572,250 | * | 3/1971 | Kriesel et al. | 102/398 |
| 3,915,092 | * | 10/1975 | Monson et al. | 102/399 |
| 4,140,061 | * | 2/1979 | Campoli | 102/521 |
| 4,165,692 | * | 8/1979 | Dufort | 102/517 |
| 4,357,888 | | 11/1982 | Phillips et al. | 114/20 R |
| 4,579,298 | * | 4/1986 | Thomson | 244/3.1 |
| 4,593,637 | * | 6/1986 | Klee | 102/399 |
| 4,732,086 | * | 3/1988 | Schiestl et al. | 102/521 |
| 4,770,102 | * | 9/1988 | Bisping et al. | 102/521 |
| 4,779,536 | | 10/1988 | Luther et al. | 102/521 |
| 4,872,409 | | 10/1989 | Becker et al. | 102/517 |
| 5,038,683 | | 8/1991 | Baker et al. | 102/308 |
| 5,097,766 | * | 3/1992 | Campoli et al. | 102/517 |
| 5,158,509 | * | 10/1992 | Ebaugh et al. | 102/517 |
| 5,162,607 | | 11/1992 | Steiner | 102/364 |
| 5,196,650 | * | 3/1993 | Cytron | 102/521 |
| 5,204,494 | * | 4/1993 | Meyer et al. | 102/521 |
| 5,275,109 | | 1/1994 | Puckett | 102/501 |
| 5,408,932 | | 4/1995 | Hesse et al. | 102/501 |
| 5,440,995 | * | 8/1995 | Levitt | 102/517 |
| 5,448,936 | | 9/1995 | Turner | 89/1.13 |

FOREIGN PATENT DOCUMENTS

| | | | | |
|---|---|---|---|---|
| 3837484 | * | 5/1990 | (DE) | 102/399 |

* cited by examiner

*Primary Examiner*—Charles T. Jordan
*Assistant Examiner*—Denise Buckley
(74) *Attorney, Agent, or Firm*—James B. Bechtel, Esq.

(57) ABSTRACT

A supercavitating water-entry projectile having empennage on the aft end which provides both aerodynamic and hydrodynamic stability and a supercavitating nose section is provided. A representative projectile is a subcaliber munition adapted for use in a 25 mm weapon using a sabot currently in use with the M919 round. The projectile has circumferential grooves around its center section to match these sabots. A key feature in the invention is the size and shape of the nose section. The projectile has a novel high strength extended blunt nose section followed by a truncated conical section which angles towards the body of the projectile in the range of five degrees. During underwater trajectory, the entire projectile is contained within the cavitation bubble formed by the blunt nose tip. The projectile's aft empennage, which provides both aerodynamic and hydrodynamic stability, fits within the bore of the weapon.

15 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 5: Graphical Illustration of Water Cavity (with the projectile profile included)

FIG. 6: Hydroballistic Potential of Long-Rod Penetrators

SUPERCAVITATING WATER-ENTRY PROJECTILE

This is a divisional of Ser. No. 09/014,688 filed on Jan. 28, 1998, U.S. Pat. No. 5,955,698.

ORIGIN OF THE INVENTION

The invention described herein was made in the performance of official duties by an employee of the Department of the Navy and may be manufactured, used, licensed by or for the Government for any government purpose without payment of royalties thereon.

FIELD OF THE INVENTION

The invention described herein relates to underwater projectiles and in particular to long-rod projectiles used for destroying underwater objects such as obstacles, torpedoes, and mines.

BACKGROUND OF THE INVENTION

Development of penetrating projectiles as currently used in anti-armor applications has addressed numerous technological difficulties in order to produce effective weapons. The basic requirements of a long-rod penetrator includes the use of high density projectiles having a long length-to-diameter ratio and having very high impact velocities. The presently available projectiles are generally used for maximum target penetration of a hardened structure. The invention adapts long-rod penetrators with the capability of traveling both in air and water where the object is to achieve low-drag water penetration for the purpose of delivering high kinetic energy to underwater targets. This requires that the hydroballistic projectile maintain stability and low drag both in air and water so that sufficient kinetic energy can be delivered to the underwater target to assure its destruction.

Current projectiles do not exhibit the capability to travel in both air and water and deliver high kinetic energy to defeat targets at any significant depth below the water surface. An operational need exists for a projectile having the capability of launch above the water surface and providing effective water travel after impact with the water surface.

SUMMARY OF THE INVENTION

It is an object of the invention to provide an air-launchable, penetrating projectile which is ballistically stable both aerodynamically and hydrodynamically.

It is another object of the invention to provide a projectile having a supercavitating nose which provides a cavitation bubble of sufficient size to encompass the body of the projectile which reduces hydrodynamic drag.

It is a yet another object of the invention to provide a projectile launchable by existing gun systems and having sufficient strength to withstand high speed water impact loads while maintaining sufficient strength and ductility to withstand gun launch and hydrodynamic loads during water travel.

In accordance with these and other objects, the invention is a supercavitating water entry projectile having aft mounted empennage which provides stabilization in both air and water and a supercavitating nose section. The projectile is a subcaliber, gun launched munitions using an appropriate sabot assembly to provide full caliber integrity. The projectile has circumferential grooves around its center section to match grooves in the sabot assembly. A key feature in the invention is the size and shape of the nose section. The projectile has a novel high strength extended blunt nose section followed by a truncated conical section which angles towards the body of the projectile in the range of five degrees. During underwater trajectory, the entire projectile is contained within the cavitation bubble formed by the blunt nose tip. The projectile's empennage, which provides both aerodynamic and hydrodynamic stability, fits within the bore of the weapon.

BRIEF DESCRIPTION OF THE DRAWINGS

The foregoing objects and other advantages of the present invention will be more fully understood from the following detailed description of representative components of a representative 25 mm projectile and reference to the appended drawings wherein.

While the aforementioned figures apply to the 25 mm projectile, the invention can be scaled to any caliber weapon.

DETAILED DESCRIPTION OF THE INVENTION

Figure 1:
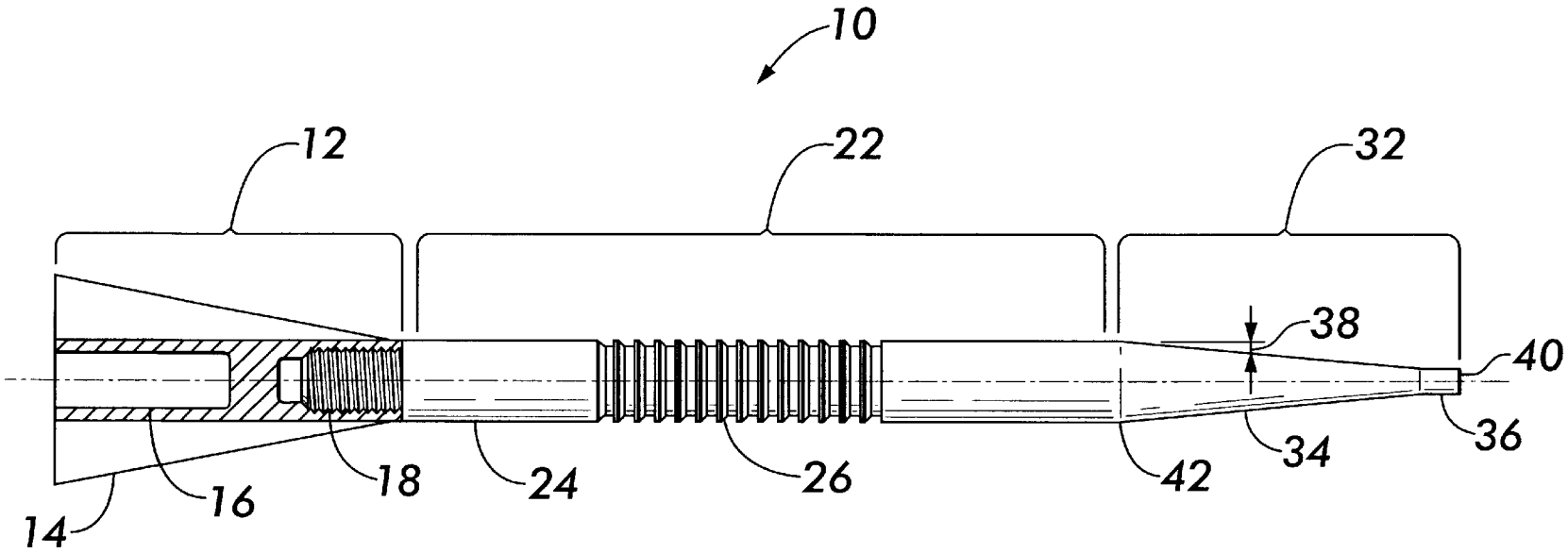
FIG. 1 is a side view of the projectile with a partial cutaway of the aft end.

Referring now to FIG. 1, the projectile 10 of the present invention is shown with its major sections depicted. The projectile has a cylindrical body comprising three major sections, the cylindrical aft section 12, the cylindrical center section 22, and the nose section 32. The steel aft section 12 is configured with suitable stabilizing empennage. This empennage is in the form of a plurality of fins 14. In the preferred embodiment, four equally spaced fins are circumferentially located around the aft section 12 and are sized to fit within the gun bore of a selected existing weapon. For aerodynamic stability, the center of gravity of the projectile 10 must be located forward of the center of pressure. The long body design of the projectile 10 with fins 14 as stabilizing empennage on the aft section 12 produces restoring force sufficient to provide good stability in both air and water. Gyroscopic-induced stability, such as used by spinning bullets in air, cannot be achieved because of the difference in the medium density of water versus air.

A payload cavity 16 is located inside the aft section 12 of the projectile 10 suitable for containing tracer material or other desired payload. The threaded aperture 18 of the main body 24 attaches into a bored aperture of the aft section 12. A threaded aperture 18 provides an attachment point for fixing the aft section 12 to the main body 24 of the projectile 10. The main body 24 is a tungsten or similar heavy metal rod comprising the center section 22 and the nose section 32 of projectile 10. On the center section 22, circumferential grooves 26 are machined to provide a matching interface for a sabot assembly (hereinafter described).

The forward or nose section 32 of the projectile 10 includes the tapered portion 34 and the supercavitating blunt nose tip 36. The nose taper angle 38 of the tapered portion 34 forms a shoulder 42 integral with the center section 22. As previously described, it is necessary to generate a water cavity such that the entire projectile 10 travels within the cavity. This cavity is produced by the supercavitating blunt nose tip 36. The supercavitating blunt nose tip 36 is cylindrical about the axis of the projectile 10 and has a flat circular face 40 which generates the water cavity as the projectile 10 travels through water.

It is imperative to the hydrodynamic stability of the projectile 10 and, thus to success of the invention, that the diametrical size of the flat circular face 40, the nose taper angle 38, and the length of the supercavitating blunt nose tip 36 be designed such that the shoulder 42 does not touch the water cavity wall before the fins 14 of the stabilizing empennage touch the water cavity wall. It is also important to minimize the hydrodynamic drag of the projectile 10 by reducing the diametrical size of flat circular face 40 as much as possible without producing a resultant increase in hydrodynamic drag as a result of the fins 14 of the stabilizing empennage contacting the water cavity wall in an excessive manner beyond what is necessary to provide hydrodynamic stabilization.

Figure 2:
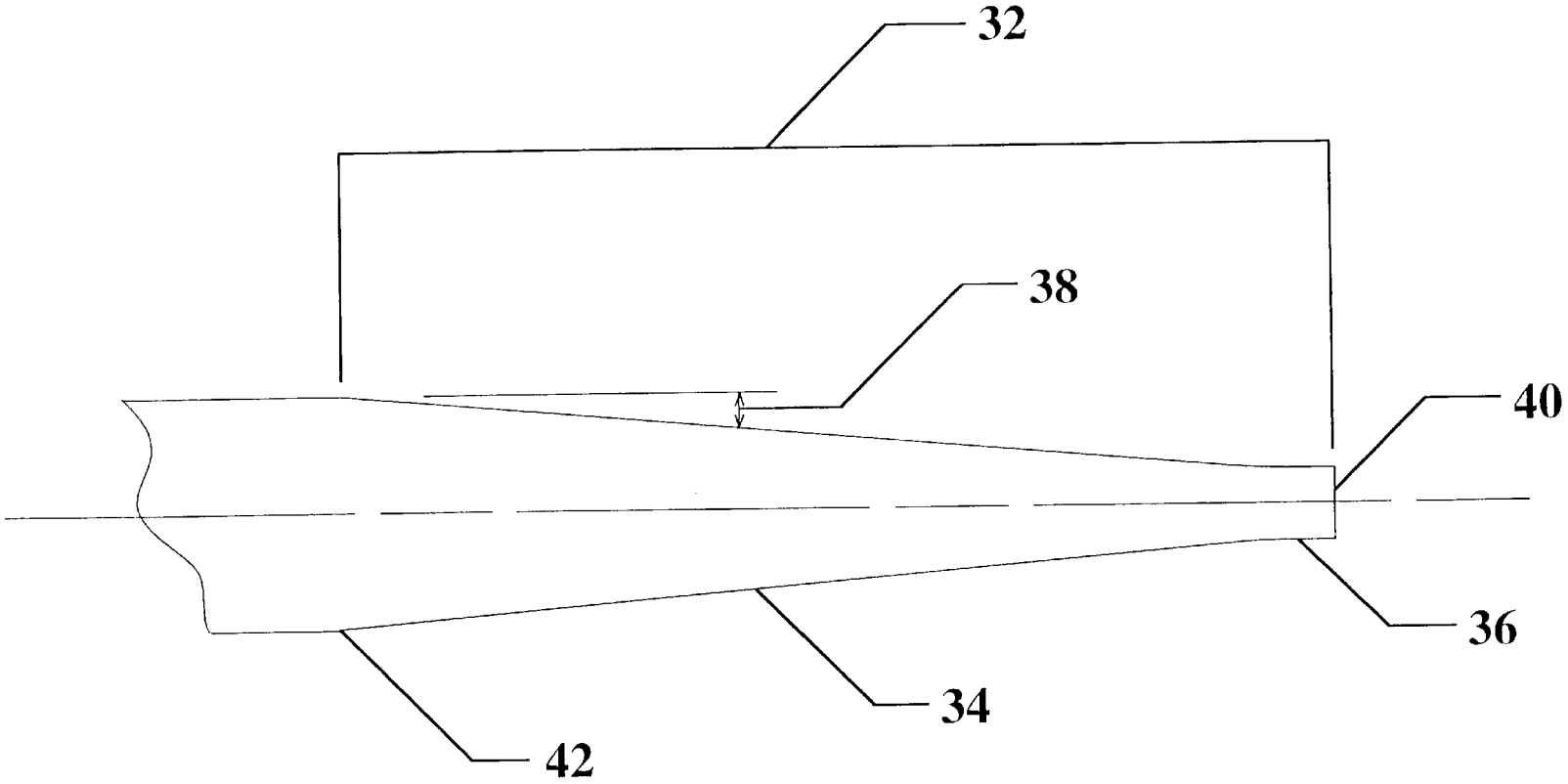
FIG. 2 is a partial side view of the supercavitating nose section of the projectile.

Referring now to FIG. 2, a detailed view of the nose section 32 is shown. The aforementioned supercavitating blunt nose tip 36 is illustrated in more detail. For the subcaliber 25 mm design having a nominal center section 22 (the center section 22 is depicted in FIG. 1) diameter of 0.327 inches, the preferred diameter of the flat circular face 40 is in the range of 0.10 inches in diameter. The preferred length of the supercavitating blunt nose tip 36 is 0.07 inches. The preferred nose taper angle 38 is five degrees.

Figure 3:
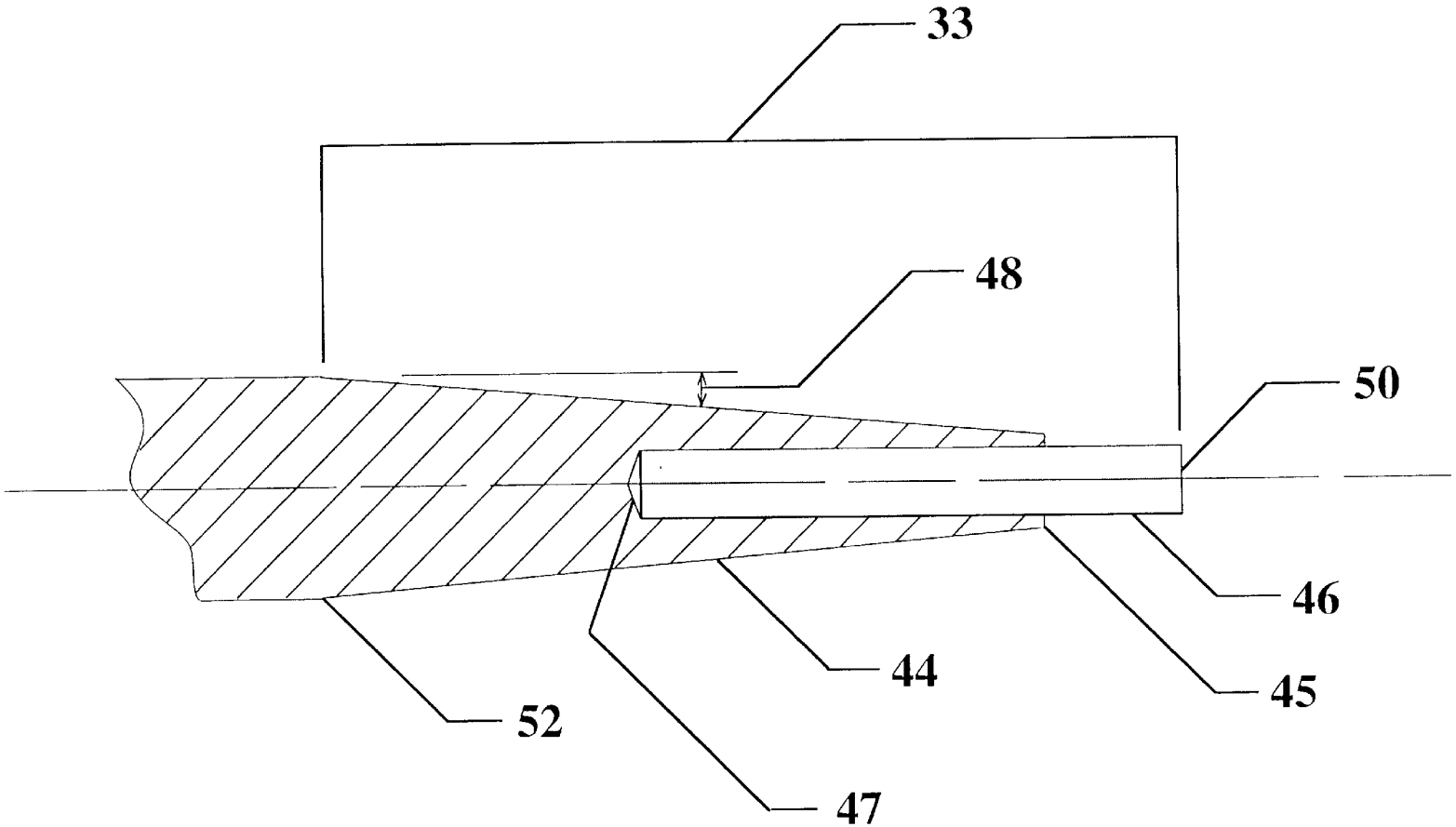
FIG. 3 is a partial side view of a cutaway depicting a variation of the supercavitating nose section of the projectile.

A variation on the supercavitating blunt nose tip 36 is depicted in FIG. 3. In some applications where the water impact loads are higher than the strength of the material of the projectile 10 (the projectile 10 is depicted in FIG. l), the supercavitating blunt nose tip 36 (as shown in FIGS. 1 and 2) is replaced by a very high strength supercavitating insert 46. The supercavitating insert 46 is made from very high strength material sufficient to withstand the loads generated by the combination of high speed water impact and impact obliquities approaching perpendicular to the water surface. The supercavitating insert 46 is cylindrical with a flat circular face 50 which generates the water cavity. The supercavitating insert 46 is placed in the insert bore 47 of the projectile 10. In this variation of the supercavitating invention, the alternative nose section 33 of the projectile 10 includes the tapered portion 44 having a nose taper angle 48 and forms a shoulder 52 with the center section 22 (the center section 22 is depicted in FIG. 1). The tapered portion 44 is terminated on the end by the lip 45. The means of securing the supercavitating insert 46 into the insert bore 47 may be secured by an interference fit, taper fit, threaded fit, or suitable bonding material.

It is imperative to the hydrodynamic stability of the projectile 10 (as shown in FIG. 1), and thus to success of the invention, that the diameter of the flat circular face 50, the length that the supercavitating insert 46 protrudes from the projectile 10, and the nose taper angle 48 be designed such that the shoulder 52 and the lip 45 do not touch the water cavity wall before the fins 14 (the fins 14 are depicted in FIG. 1) touch the water cavity wall. However, in order to minimize the hydrodynamic drag of the projectile 10, the diametrical size of flat circular face 50 must be reduced as much as possible without producing a resultant increase in hydrodynamic drag which results when the fins 14 of the stabilizing empennage protrude into the water cavity wall to an excessive depth beyond what is necessary to provide hydrodynamic stabilization.

For the subcaliber 25 mm design having a nominal center section 22 (the center section 22 is depicted in FIG. 1) diameter of 0.327 inches, the preferred diameter of the flat circular face 50 of the supercavitating insert 46 is on the order of 0.10 inches in diameter. The preferred protrusion distance of the supercavitating insert 46 from the face of the lip 45 is 0.20 inches. The preferred diameter of the lip 45 is 0.136 inches. The preferred nose taper angle 48 is five degrees.

Figure 4:
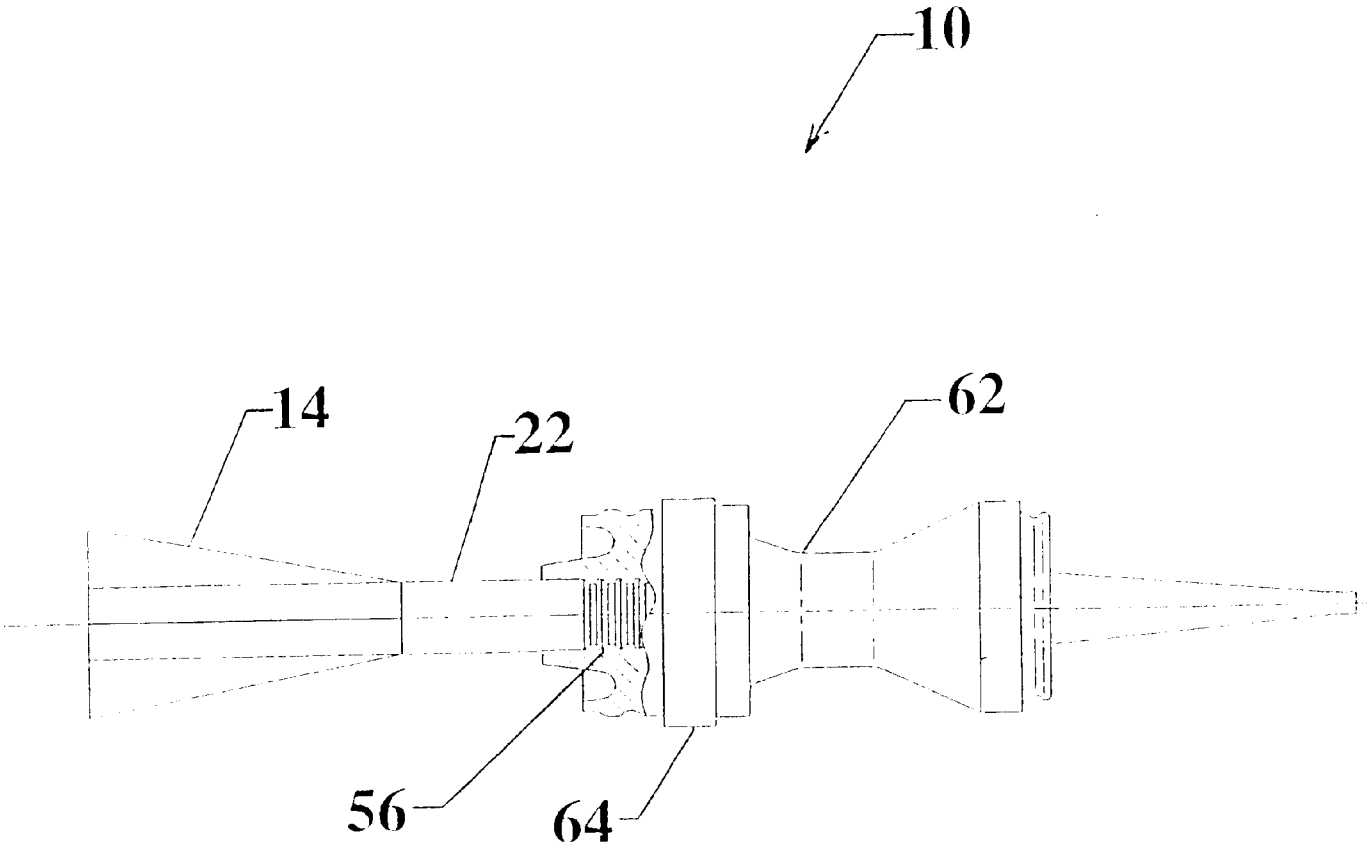
FIG. 4 is a side view of the projectile with the sabot installed.

The overall configuration of the projectile 10 with the three sabot petals 62 is shown in FIG. 4. The sabot petal 62 is formed in a 120 degree segment and the three sabot petals form a complete 360 degree fit over the center section 22 of projectile 10. The circumferential grooves 26 (as shown in FIG. 1) of the projectile 10 match with the circumferential sabot grooves 56. The sabots are held in place by the obturation band 64. The obturation band 64 provides a gas seal during cartridge actuation in the weapon. During firing, the sabot petals 62 and the obturation band 64 separate from the projectile 10 shortly after muzzle exit from the weapon. Stabilizing fins 14 are shown for reference.

Operation of the Invention

Figure 5:
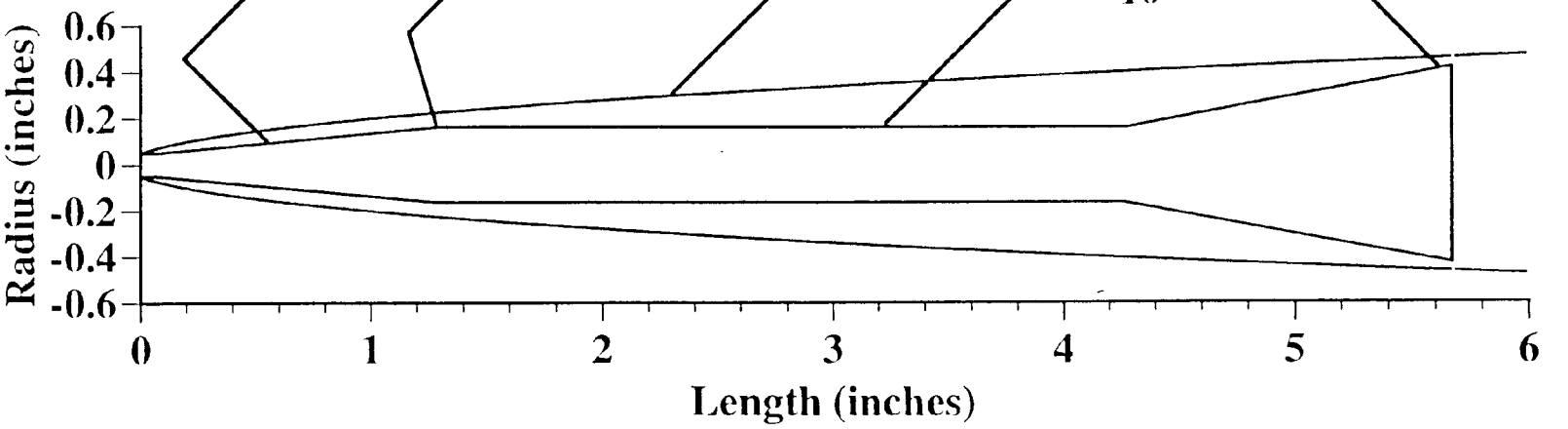
FIG. 5 is a graphical representation of the cavitation bubble with a profile of the projectile included.

FIG. 5 is a two-dimensional, graphical representation of the cavitation bubble formed by travel of the blunt nose through the water. The cavity radius in units of inches, along the ordinate of the graph, is shown with respect to length of cavity in units of inches, along the abscissa. The water cavity wall 72 stands off from the nose section 32 of the projectile and off the entire projectile 10. By this means, the entire projectile 10 travels inside of the cavitation bubble as it travels through the water. In this illustration, it can be seen that if the projectile 10 is disturbed about its longitudinal axis, the tip of the fins 14 will contact the water cavity wall prior to the shoulder 42.

Figure 6:
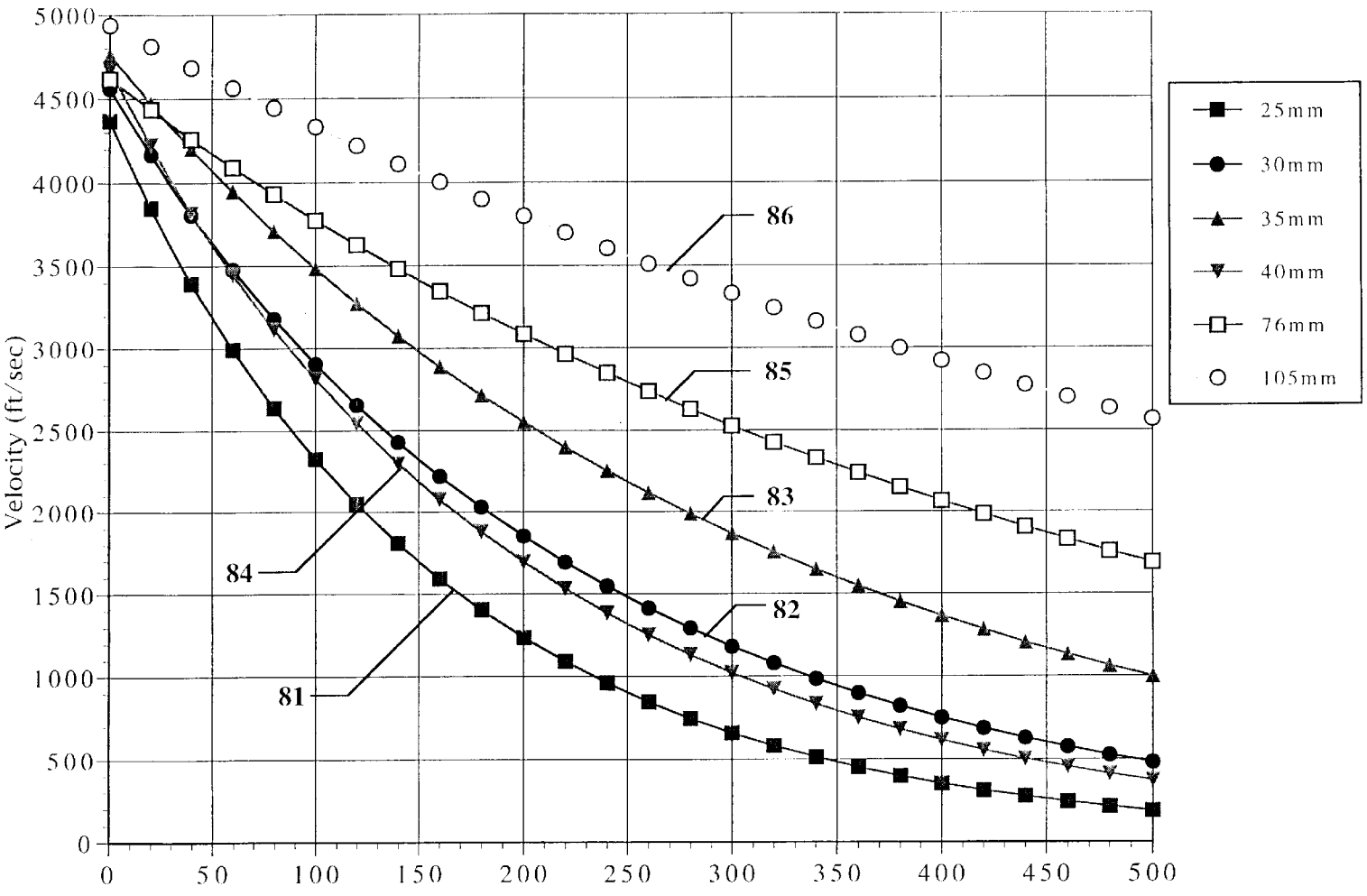
FIG. 6 is a graphical representation depicting decreasing underwater velocity for increasing underwater range.

One embodiment of the invention is adapted to a subcaliber projectile launched from a 25 mm caliber cannon. The cartridge used to launch the projectile utilized existing parts from the standard M919 cartridge, including the 25 mm sabot assembly, the obturator, and the propelling charge. The invention, however, can be applied in similar fashion to other long-rod projectiles. FIG. 6 illustrates the hydroballistic capabilities of several calibers of long-rod projectiles with the invention incorporated into the round. The projectile velocity in units of feet per second, along the ordinate of the graph, is shown with respect to range of water travel in units of feet, along the abscissa. The 25 mm hydroballistic potential 81 shows the exponential decay typical of velocity degradation while traveling through a fluid medium. The 30 mm hydroballistic potential 82, the 35 mm hydroballistic potential 83, the 40 mm hydroballistic potential 84, the 76 mm hydroballistic potential 85, and the 105 mm hydroballistic potential 86 are also shown in this graph. The water entry velocities of each caliber represented in the graph are decayed from the muzzle velocity by 1000 feet of air flight. The velocity potential of each caliber cartridge is driven by the particular design.

The features and advantages of the present invention are numerous. The invention's unique supercavitating nose section allows current long-rod ammunition designs to have hydroballistic potential. The supercavitating nose, which is designed to be incorporated as part of a subcaliber projectile such as the M919's subcaliber projectile, is based upon a truncated cone with an extended tip whose diameter in this particular projectile is 0.10 inch. The base diameter of the truncated cone is the diameter of the cylindrical center section of the subcaliber projectile body. The angle of the truncated cone determines the majority of the length of the supercavitating nose. The length of the extended tip, expressed in terms of the diameter of the tip, can be as short as 0.2 times the diameter to as long as 2.0 times the diameter. The extended tip diameter, the length of the extended tip, and the cone angle are critical to the stability during water entry and subsequent travel to the underwater target. The nose diameter also controls the diameter of the water cavity such that the water cavity wall clears the shoulder of the nose cone at the joint with the projectile's cylindrical center section. However, the stabilizing empennage on the aft end of the projectile can contact the water cavity wall providing stability before the unstable situation of the cone shoulder contacting the water cavity wall can occur.

The supercavitating nose tip diameter is made as small as possible to reduce the hydrodynamic drag which results in high kinetic energy delivered to the target. The supercavitating nose tip diameter and cone angle are designed to optimize drag reduction while maintaining the required shape and mass distribution to promote stability not only in water but also in air.

The material chosen for the projectile has a number of properties critical to the design. The tungsten alloy or heavy metal equivalent must withstand the high impact loads due to high velocity water impact, particularly for the nose tip. The projectile material must also maintain strength and ductility to withstand gun launch and hydrodynamic loads during underwater travel. To achieve high kinetic energy at the target, the density of the material must be high. The materials of the present invention achieved but are not limited to water entry velocities up to 4300 feet per second.

The use of the aft empennage for stabilization in both air and water gives further advantage to the invention. Using the empennage for both fluid mediums gives the invention robustness with simplicity. The empennage is preferably in the form of fins, but it may be of a flared nature (flared designs have strength and mass property disadvantages).

The projectile's basic construction is based on a long-rod projectile design which incorporates empennage on the aft end of the projectile that provides both aerodynamic and hydrodynamic stability. The front end, or nose, of the projectile is shaped in such a way that the water is displaced by the nose tip, creating a cavitation bubble which is large enough for the rest of the projectile to travel in. The 25 mm M919 cartridge was chosen as the basis for proof of the invention, but would apply to other calibers as well. The shape of the existing M919 projectile was modified to incorporate the supercavitating nose.

Although the invention has been described relative to a specific embodiment thereof, there are numerous variations and modifications that will be readily apparent to those skilled in the art in the light of the above teachings. Variations in nose tip design may improve the capability slightly. To achieve underwater stability, the water cavity formed by the tip must clear the forward part of the body such that the fins can stabilize the projectile. Nose tip designs including smaller diameter flats, flared, conical, and power law shapes can be adapted to the projectile to optimize drag. It is therefore to be understood that, within the scope of the appended claims, the invention may be practiced other that as specifically described.

What is claimed as new and desired to be secured by Letters Patent of the United States is:

1. An air-launched, supercavitating water-entry projectile comprising:

a cylindrical long body having forward and aft sections;

a plurality of aerodynamic and hydrodynamic stabilizing fins attached to the aft section of said cylindrical body; and a supercavitating nose section attached forward and integral of said cylindrical body comprising a truncated conical section with a supercavitating blunt nose tip in the front.

2. An air-launched, supercavitating water-entry projectile as in claim 1 wherein said cylindrical body further comprises a cylindrical aft section having a payload cavity on a rearward end and a threaded aperture on a forward end.

3. An air-launched, supercavitating water-entry projectile as in claim 1 wherein said plurality of stabilizing fins comprise four fins equally spaced around the aft section of said cylindrical body.

4. An air-launched, supercavitating water-entry projectile as in claim 3 wherein said fins are fabricated of steel.

5. An air-launched, supercavitating water-entry projectile as in claim 1 wherein said supercavitating nose section is fabricated using a tungsten alloy.

6. An air-launched, supercavitating water-entry projectile as in claim 1 wherein said cylindrical body is fabricated using tungsten alloy.

7. An air-launched, supercavitating water-entry long body projectile comprising:

a cylindrical aft section having a payload cavity on a rearward end and a bored aperture on a forward end;

a plurality of aerodynamic and hydrodynamic stabilizing fins attached to said cylindrical aft section;

a cylindrical center section attached to the bored aperture of said cylindrical aft section; and, a nose section attached to said center section, said nose section including an extended blunt nose tip to generate an underwater cavitation bubble larger at all longitudinal location than the diameter of the projectile body at the corresponding longitudinal position.

8. An air-launched, supercavitating water-entry projectile as in claim 7 wherein said plurality of stabilizing fins are fabricated of steel.

9. An air-launched, supercavitating water-entry projectile as in claim 7 wherein said plurality of stabilizing fins comprise four stabilizing fins.

10. An air-launched, supercavitating water-entry projectile as in claim 7 wherein said cylindrical center section further comprises a center section having circumferential grooves adapted to interface with existing standard sabots.

11. An air-launched, supercavitating water-entry projectile as in claim 7 wherein said cylindrical center section is fabricated from tungsten alloy.

12. An air-launched, supercavitating water-entry projectile as in claim 7 wherein said nose tip has a diameter of approximately 0.10 inches.

13. An air-launched, supercavitating water-entry projectile as in claim 7 wherein said nose section is capable of achieving aerodynamic and hydrodynamic stabilization when used with said plurality of stabilizing fins.

14. A method for destroying water objects, comprising the steps of:

providing an aerodynamically and hydrodynamically stable air-launched, supercavitating water-entry long body projectile comprising a cylindrical body having forward and aft sections, a plurality of aerodynamic and hydrodynamic stabilizing fins attached to the aft section of said cylindrical body, and a supercavitating nose section attached forward and integral of said cylindrical body comprising a truncated conical section with a supercavitating blunt nose tip in the front, wherein said projectile enters the water at a supercavitating velocity, and, air-launching said projectile from above the water with sufficient kinetic energy to enter a body of water and destroy the underwater object.

15. A method for removing water objects as in claim 14 wherein said projectile has sufficient kinetic energy to impart a velocity of approximately 4300 feet per second to the projectile at the surface of the water.

* * * * *